3,327,022
GRAFT COPOLYMERS OF BUTADIENE, ACRYLO-
NITRILE AND DIETHYLENICALLY UNSATU-
RATED MONOMERS ONTO VINYL CHLORIDE
POLYMERS
Marcel Riou, Neuilly-sur-Seine, and Jean-Marie Michel
Champigny-sur-Marne, France, assignors to Pechiney,
Compagnie de Produits Chimiques et Electrometal-
lurgiques, Paris, France, a corporation of France
No Drawing. Filed Apr. 5, 1965, Ser. No. 445,703
Claims priority, application France, Aug. 7, 1959,
802,321, Patent 1,309,809
10 Claims. (Cl. 260—879)

This application is a continuation-in-part of application 47,149, filed Aug. 3, 1960, now abandoned.

The present invention relates to new improved graft copolymers obtained by grafting a mixture of butadiene and acrylonitrile to polyvinyl chloride.

A number of graft copolymers have been known for a long time. Graft copolymers consists of a main chain, called a trunk, onto which are grafted side chains, or branches, of a different chemical structure. Various methods of grafting are known in the prior art including grafting by chain transfer, ozonization, irradiation, radiochemical peroxidation, etc. This prior art indicates it is possible to graft a great variety of copolymerizable monomers or mixtures thereof onto a great variety of synthetic polymer trunks. In spite of these generalizations, the preparation and study of only a small number of the theoretically foreseen graft polymers have been carried out effectively. Moreover the characteristics of graft copolymers differ very greatly from those of copolymers obtained by simultaneous polymerization of the monomers and from those mixtures of the corresponding homopolymers. Thus, it is not possible to foresee the precise properties of the graft copolymers which have not yet been prepared, though the general processes for their preparation have been already forecast.

The graft polymers of this invention contain a polyvinyl chloride polymer trunk having branches formed from a mixture of butadiene and acrylonitrile monomers.

It is known that the addition of plasticizing agents to polyvinyl chloride lowers its elasticity modulus and improves many of its physical properties; however, it is known that many of these desirable properties, such as flexibility gradually disappear in a given period of time and due to plasticizer migration the polymer becomes brittle.

It is an object of the invention to lower the elasticity modulus of polyvinyl chloride polymers without the addition of a plasticizing agent and hence to secure either flexible products of very low elasticity modulus, or semi-stiff to stiff impact resistant products of relatively high elasticity modulus, yet still lower than the one of polyvinyl chloride and other polyvinyl graft copolymers.

Another object of this invention is to provide a polyvinyl chloride graft polymer process that does not require a chain transfer agent.

Another object of this invention is to produce polyvinyl chloride-butadiene-acrylonitrile polymers that have improved solubility characteristics.

We have discovered that when a mixture of butadiene and acrylonitrile are grafted to long chain polyvinyl chloride trunks in the presence of a polymerization initiator the above objects are obtained and that particularly superior polyvinyl chloride-butadiene-acrylonitrile graft polymers are produced when the trunk to monomer mixture ratio is 60/40 to 45/55 and the monomer mixture is grafted to the trunk in the presence of a catalyst; and still better polymers are obtained when a third monomer selected from the group consisting of divinylbenzene and tetraethyleneglycol dimethacrylate is added to the monomer grafting mixture.

We have also discovered that the polymers produced in accordance with this invention maintain their desirable properties for an indefinite time and plasticizing migration is no longer a problem.

In accordance with the invention the polyvinyl chloride used is prepared beforehand, according to known processes, as a solution, a solid product, a suspension or an emulsion, either in the presence of a catalyst, such as a peroxide catalyst or in the presence of ionizing radiation. The conditions under which the polyvinyl chloride is prepared have an influence on the physical properties of the final graft copolymer. Generally speaking, when the polyvinyl chloride is prepared at a low temperature, which leads to longer chains and very high molecular weights, the graft polymer has better physical properties than a similar product prepared from polyvinyl chloride with shorter chains and relatively lower molecular weights.

The composition and proportions of the mixture of monomers used for grafting play an important part in determining the properties exhibited by the product and the degree of internal plasticization of the product.

Butadiene confers special properties to the final copolymer, for example, it lowers the softening temperature and increases the impact resistance of polyvinyl chloride per se. Due to the presence of residual unsaturation in the side chains of the graft copolymer, the latter is subject to cross-polymerization. However, this unsaturation may make the product sensitive to reaction with oxygen when the grafting has been carried out with high proportions of diolefin. In order to eliminate this drawback one may add the conventional anti-oxidant materials as well known in the chemistry of elastomers.

The amount of acrylonitrile which has only one vinylic double bond, added to the butadiene greatly modifies the final product. The acrylonitrile plays a double part in forming the graft copolymer. On the one hand, it increases the grafting speed, on the other hand, by copolymerizing with butadiene, it introduces into the macromolecule specific characteristics due to its structure, which improve the physical and mechanical properties of the resin product.

The exact proportions of conjugated diolefin and copolymerizable monomer are not critical. The proportions used depend on the qualities which are desired in the final product. However, the balanced characteristics of the graft copolymer are not obtained unless important quantities of both butadiene and acrylic monomer are present when forming the graft polymer. In general the proportion of conjugated diolefin may be between 5 and 90% of the monomer mixture but a proportion between about 20 and 80% is preferred. Correspondingly, of course, the proportions of acrylic monomer would vary between 95 and 10% and preferably between about 80 and 20%. The amount of monomer in the polymer needed to obtain the best physical properties is 40 to 55% by weight of the polymer.

In order to graft the mixture of butadiene monomer and acrylonitrile upon the polyvinyl chloride trunk, any known catalytic method may be used. For example, chain transfer grafting in the presence of a conventional chemical or polymerization initiator, either a radical or ionic initiator works well. And also one may use irradiation grafting by means of ionizing radiations such as gamma radiation of cobalt-60, with a dosage rate less than 50,000 rad/hour, the latter process being advantageous in that it does not incorporate foreign matter into the polymer. In all cases, grafting reactions may be carried out in a suspension or an emulsion. In general, grafting is effected in a freshly prepared suspension or emulsion of polyvinyl chloride in the presence of a polymerization initiator; the initiator may be introduced with the monomer mixture both operations being carried out successively in the same apparatus.

It may be necessary or desirable, in the course of the different operations leading to the production of the final graft polymers, to introduce with the monomer mixture, various agents selected from the group of vinyl and vinylidene monomers consisting of divinylbenzene, divinylether, monoalkyleneglycol dimethacrylate, polyalkyleneglycoldimethacrylate, monoalkyleneglycol diacrylate, polyalkyleneglycol diacrylate, allyl acrylate, allyl methacrylate, allyl phthalate, allyl cyanurate, methacrylamide, cyanomethacrylate, thiomethacrylate, 1,1-dichlorethylene, 1-bromo, 1-chloro ethylene, vinylacetate, vinyl-pyridine, methylstyrene, dimethylstyrene, alphachlorostyrene, dichlorostyrene, cyanostyrene, methoxystyrene, vinylnaphthalene; maleic and fumaric esters, chloromaleic and chlorofumaric esters; the proportions of these various agents range up to 10% by weight, such as for instance between 0.5 and 10% by weight and preferably between 1 to 5% by weight of the monomer mixture. An advantage of introducing in the polymer such components is in relation with the specific character of their structure and in particular to the chemical functions they bear.

In current procedure of polymerization, it is usual to to add a chain transfer agent such as a mercaptan; but this is a disadvantage of the prior art, since it confers an odor to the final product, it decreases the rate of grafting and it constitutes an impurity.

According to the invention, we do not add a chain transfer agent.

The properties of the graft polymers of the instant invention are quite different from those of polyvinyl chloride per se and can be varied by varying the length of polyvinyl chloride chain and the proportions by weight of the monomers relative to one another and their overall proportions compared to the quantity of polyvinyl chloride.

Broadly speaking, different types of polymers may be prepared by varying the proportion of butadiene to acrylonitrile. For example one may produce stiff or semi-stiff products by keeping the proportion of the diene monomer in the final product below 15%. The stiff and semi-stiff polymers are readily worked up on a calender mixer between rolls. Their tensile modulus is in the order of 12,000 to 15,000 kg./cm.$^2$. They are transparent. They have a softening temperature comparable with that of a non-grafted polyvinyl chloride. They have an excellent and greatly superior impact resistance. When measuring the impact resistance by Charpy method on notched bars, values generally higher than 100 kg./cm./cm.$^2$ are obtained. By way of comparison, a stiff polyvinyl chloride exhibits an impact resistance of 5 to 10 kg./cm./cm.$^2$ under the same conditions.

Flexible products may be produced by keeping the proportion of diene monomer in the final polymer higher than 15%. The flexible polymers of this invention are transparent and they retain their flexibility even at very low temperatures.

The grafted polymers of this invention are not limited to those of the plastic masses obtained after coagulation and processing of latices. The latices themselves present specially interesting and sought for qualities. When the proportion of butadiene in the latices is approximately 15% or more, the prepared latices are film forming in the cold or at room temperature. This means that a coating of the latices on a glass plate, for instance, after being permitted to dry by evaporation, forms thereon a thin, adherent flexible film which exhibits good mechanical properties. Of course, the exact proportion of 15% is not critical.

The qualities of the films are related to the percentage of the diene and to the total quantity of branch monomers in the product. Therefore, various procedures are available for modifying the properties of the film with regard to the desired application. The latices of this invention have many uses. For example, they may be used in the manufacture of paints and stiffenings, the sizing of paper, the preparation of non-woven fabrics, etc.

The graft polymers of this invention are capable of cross-linking, due to the presence of double bonds on the side chains. This makes it possible to improve the mechanical properties of the finished articles.

The following purely illustrative examples illustrate the method by which the graft copolymers of the instant invention are produced and their importance. Where not otherwise stated, parts and percentages are expressed in parts by weight and percentages by weight.

*Example 1*

(a) Nine (9) liters of deionized water, 2.5 kg. of vinyl chloride monomer and 25 g. of a long chain fatty acid sulfate acting as an emulsifier, were introduced into a 20 liter stainless steel autoclave which had a stirrer and a device enabling one to introduce inside the autoclave a stick of radioactive cobalt, sheathed with stainless steel,, having a power corresponding to 130 curies. Under such conditions, the average dosage rate is 10,000 rad/hour.

The temperature of the reaction mass was raised to 60° C. and the radioactive source was introduced into the autoclave. The polyvinyl chloride was thereby radiopolymerized until the beginning of a decrease in pressure was observed. The reaction was continued for an additional ½ hour, then the radioactive source was removed and the autoclave was blown out with nitrogen. A polyvinyl chloride latex was obtained with a molecular weight of the order of 60,000 and an intrinsic viscosity of 0.9.

(b) Upon lowering the temperature to 50° C., a mixture of freshly distilled butadiene (1500 g.) and acrylonitrile (500 g.) was introduced.

Taking into account the quantity of butadiene, the polymerization occurred at a relatively high velocity. After 4 hours irradiation, a 70–75% conversion was obtained.

The grafted latex was film forming when hot as well as when cold.

The polymer obtained was easily worked up on a cylinder, at low temperature (80–90° C.), giving rise to transparent, very flexible, slightly crisped sheets which had a tensile strength of 390 kg./cm.$^2$, an elongation of 130%, and an elasticity modulus of 9,450 kg./cm.$^2$ at −5° C.

When the proportion of acrylonitrile was increased and/or if the butadiene proportion was decreased, the mechanical properties of these graft copolymers were altered; in particular, the tensile modulus was greatly increased.

For example, when the procedure of Example 1 was followed using 500 g. of butadiene and 1500 g. of acrylonitrile the polymer product obtained had a tensile strength of 309 kg./cm.$^2$, an elongation of 115%, and an elasticity modulus of 16,800 kg./cm.$^2$. All these polymers had a good impact resistance in the order of 15 kg./cm./cm.$^2$.

Polyvinyl chloride/acrylonitrile graft copolymers, prepared under the same conditions but with butadiene being excluded, exhibit very great brittleness and their impact resistance was much lower than that of pure polyvinyl chloride.

*Example 2*

This example is intended to show the effect of the chain length of the polyvinyl chloride on the properties of the graft polymer.

(a) Nine (9) liters of deionized water, 2.5 kg. of monomer vinyl chloride and 25 g. of a long chain fatty alcohol sulfate serving as an emulsifier were introduced into a 16 liter stainless steel autoclave which had a stirrer and a device enabling one to introduce into the inside thereof a stick of radioactive cobalt, sheathed with stainless steel, having a power corresponding to 130 curies. The temperature was raised to 60° C. and the radioactive source was introduced into the autoclave. The vinyl chloride was polymerized until the beginning of a pressure decrease was observed. The reaction was continued for ½ hour, then the radioactive source was removed. The autoclave was degassed and blown out with nitrogen. The intrinsic viscosity of the polyvinyl chloride obtained was 0.9. The temperature was lowered to 50° and a mixture of 1,500 g. of butadiene and 500 g. of acrylonitrile was introduced. After 1 hour of swelling, the emulsion was irradiated. The reaction was followed by the variations of the pressure inside the autoclave and stopped when the pressure reached was near 1 kg.

The emulsion was cooled down to 20° C. An emulsion containing 15 g. of trinonylphenylphosphite in 150 cm.$^3$ water and 1.5 g. of sodium lauryl sulfate, was added to the former. The latex was coagulated and the polymer was drained, washed and dried (Polymer A).

(b) The procedure was carried out as indicated in the preceding paragraph, the only modification being in the polyvinyl chloride polymerization temperature which was regulated by a brine at 0° C. being circulated through the autoclave jacket. Polymerization was checked by means of the density variation of the latex. The polyvinyl chloride thus obtained had an intrinsic viscosity of 3.

After graft polymerization, the latex was coagulated, the polymer drained, washed and dried (Polymer B).

Polymers A and B could be machined on a calender at a low temperature. Polymer B gave a more uniform rim and a smoother sheet. Polymer A gave a sheet which was generally rough and crisped.

The mechanical properties which were determined in both samples are the following:

|  | Tensile strength, kg./cm.$^2$ | Elongation, Percent | Temperatures at which the following elasticity modulus were obtained, ° C. | | |
|---|---|---|---|---|---|
|  |  |  | 9,450 kg./cm.$^2$ | 700 kg./cm.$^2$ | 125 kg./cm.$^2$ |
| Polymer A | 130 | 130 | −5 | +15 | +49 |
| Polymer B | 250 | 180 | −29 | +2 | +47 |

*Examples 3 to 5*

(a) Into a 200 liter stainless steel autoclave were charged 120 liters of deionized water, 330 g. of sodium lauryl sulfate, 18 g. of potassium persulfate, 9 g. of metabisulfite, and 66 g. of sodium carbonate. After the aqueous solution had been degassed under a nitrogen current, 33 kg. of monomeric vinyl chloride was charged into the autoclave. The temperature was raised to 60° C. and maintained at that point until the pressure inside the autoclave was near 3 kg./cm.$^2$. After polymerization the residual monomer was removed, nitrogen was blown through the autoclave, and the temperature of the polyvinyl latices was lowered to 20° C.

Then, under nitrogen current, the following additional catalytic system was introduced separately in the following order and in proportion to the foreseen quantities of the monomers (acrylonitrile and butadiene) that is to say by writing down that P is the total sum of the monomers weights: P/100 pyrophosphate in 2 liters of boiled water which had been cooled under nitrogen, P/100 glucose and 0.09 P/1,000 ferric nitrate in 2 liters of boiled water, 0.36 P/1,000 cumene hydroperoxide along with a solution containing 20 g. of sodium hydroxide.

After the latex had been agitated for about ½ hour, the desired mixture of butadiene, acrylonitrile and cumene hydroperoxide were added. The temperature was raised to 40° C. and maintained at that point during the whole reaction.

The grafting reaction was continued until a pressure of 1 to 1.5 kg. at 40° C. had been reached. After the residual monomer had been degassed, there was introduced firstly, a solution of 0.3 P/1,000 of hydroquinone, 0.03 P/1,000 of sodium sulfite in 200 cm.$^3$ of water and secondly, an emulsion of a trinonylphenylphosphite type anti-oxidant in the proportion of 1% of the quantity of used butadiene.

The obtained latex was coagulated according to the conventional techniques, such as by the addition of calcium or sodium chloride, and the polymer was drained, washed, and dried.

The relative proportions of vinyl chloride, butadiene and acrylonitrile bound into the graft polymer formed are set out in the table below. The proportions of polyvinyl chloride, butadiene and acrylonitrile were selected so that they were bound in the proportions also set out in the table below.

The mechanical properties of the polymers obtained in Examples 3 to 5 have been determined and compared. The results are reported in the following table.

| Test No. | Composition of Graft Polymer (parts by weight) | | | Tensile strength, kg./cm.$^2$ | Elongation, percent | Temperatures at which the following elasticity modulus were obtained, ° C. | | |
|---|---|---|---|---|---|---|---|---|
|  | Vinyl chloride | Butadiene | Acrylonitrile |  |  | 9,450 kg./cm.$^2$ | 700 kg./cm.$^2$ | 125 kg./cm.$^2$ |
| Ex 3 | 5 | 3 | 1 | 130 | 100 | −27 | 22 | 47 |
| Ex 4 | 5 | 4 | 1 | 130 | 150 | −46 | 18 | 43 |
| Ex 5 | 5 | 2 | 2 | 250 | 170 | +8 | 28 | 46 |

Examples 3 to 5 show that by increasing the proportion of butadiene it very largely affects the elasticity modulus of the graft polymer, while the important properties of tensile strength and elongation are retained. All three polymers were easily machined on a calender at relatively low temperatures (lower than or equal to 100° C.), were flexible and transparent, and maintained permanent plasticity.

*Example 6*

Into a 16 liter stainless steel autoclave were introduced 6 liters of deionized water, 100 g. of an emulsifier of the alkylaryl sodium sulfonate type, 2.2 g. of potassium persulfate, and 1.1 g. of potassium metabisulfite. The pH was adjusted to 10, by adding sodium carbonate; 3,300 g. of monomer vinyl chloride were introduced and polymerization was carried out at 60° C. until the pressure reached 3–4 kg. Then the residual monomer was degassed under nitrogen current and the latex cooled down to 20° C.

Then the following catalyst system was introduced: a solution of 13 g. of sodium pyrophosphate decahydrate in 100 cm.$^3$ water, and a solution of 0.24 g. of ferric nitrate and 26 g. of glucose in 100 cm.$^3$ water. After each addition, the latex was agitated for about ¼ hour. The pH was then adjusted to 8, after which, a solution of 1 g. of cumene hydroperoxide in 2,000 g. of butadiene and 650 g. of acrylonitrile was introduced. Polymerization was carried out at 50° C.

The latex obtained titrated approximately 50% dry substances. On being evaporated on a smooth surface it formed a transparent film with high elongation (450 to 500%). It withstood water remarkably well and had a resistance to ultraviolet radiations higher than that of a latex of butadiene-styrene copolymer containing 90% styrene.

To illustrate a desirable property of the graft polymers produced in accordance with this invention, that is when the grafting is accomplished in the presence of a catalyst, versus the prior art method of grafting without a catalyst, note Examples 7(a) and 7(b).

*Example 7*

(a) The graft polymer was prepared using a typical prior art process.

The following ingredients were introduced in an autoclave to prepare the trunk:

| | G. |
|---|---|
| Vinylchloride | 6,000 |
| Alkylated aryl sulfonate | 462 |
| Potassium persulfate | 18 |
| Deionized water | 6,000 |

The polymerization reaction was carried out at 45° C. for 18 hours; the conversion rate was 93.5% by weight. After degassing the remaining monomer, the following ingredients were introduced into the autoclave:

| | G. |
|---|---|
| Butadiene | 1950 |
| Acrylonitrile | 650 |
| Deionized water | 1450 |
| Ter-dodecyl mercaptan | 0.7 |

The grafting reaction was carried out at 65° C. Both reactions, polymerization of the trunk and grafting, were agitated with an anchor type agitator turning at a speed of 125 revolutions/minute.

After 4 hour's reaction, the conversion ratio of the grafting reaction was of 54% by weight, and an aliquot part of the latex of the reaction medium was withdrawn, and treated according to conventional means to precipitate the grafted polymer (i.e. an anti-oxidant was added to the latex, which was then coagulated, in the cold with methanol); the precipitated polymer was washed and dried under vacuum at room temperature to avoid oxidation and cross-linking.

A similar test was performed in a 5 liter autoclave with ⅓ the amount of the aforementioned ingredients being present: the same results were obtained.

The dried grafted polymer was *insoluble* in both hot and cold dichloroethane. It swelled yielding small jellied agglomerates.

(b) Preparation of the graft polymer using the process of this invention.

The following ingredients were introduced in an autoclave to prepare the trunk:

| | G. |
|---|---|
| Vinyl chloride | 850 |
| Stearic acid | 22.4 |
| Sodium hydroxide | 1.6 |
| Sodium carbonate | 1.7 |
| Potassium persulfate | 0.45 |
| Sodium methabisulfite | 0.226 |
| Deionized water | 3,000 |

The polymerization reaction was carried out at 60° C. for 6 hours; the conversion rate was 95% by weight. After degassing of the remaining unreacted monomer, the following ingredients were introduced in the autoclave:

| | G. |
|---|---|
| Sodium pyrophosphate ($P_2O_7Na_4,10H_2O$) | 8.5 |
| Sodium hydroxide | 1.1 |
| (In 100 ml. of water) | |
| Glucose | 4.25 |
| Hydrated ferric nitrate | 0.077 |
| (In 100 ml. of water) | |
| Butadiene | 680 |
| Acrylonitrile | 170 |
| Cumene hydroperoxide | 0.306 |

The grafting reaction was carried out at 40° C. The initial speed of the reaction is of 25%/hour. Both reactions—trunk polymerization and grafting—were agitated with an anchor type agitator turning at a speed of 125 revolutions/minute.

After 4 hours' reaction, the conversion ratio of the grafting reaction was of 87% by weight, and an equal aliquot part was withdrawn and treated as in experiment (a) above; a dry grafted polymer was obtained.

This polymer is entirely *soluble* in hot dichloroethane.

The behavior of polymers (a) and (b) are entirely different; this shows that the products obtained are different.

The following examples illustrate respectively the addition of divinylbenzene and tetraethyleneglycol dimethacrylate to the monomer mixture of butadiene and acrylonitrile. These grafting compositions produced especially desirable polymer compositions.

*Example 8*

In a 16 liter stainless steel autoclave were placed 9 liters of deionized water, 64 g. of stearic acid, 4.65 g. of sodium hydroxide, 1.36 g. of potassium persulfate and 0.67 g. of sodium metabisulfite. This solution was degassed under nitrogen current and 2500 g. of vinylchloride monomer were added.

The temperature was maintained at 60° C. until the pressure decreased to 2–3 kg./cm.$^2$. Then the residual monomer was degassed and the autoclave contents cooled to about 20° C.

Then the three following solutions were introduced:

| (a) | G. |
|---|---|
| Sodium pyrophosphate ($P_2O_7Na_4,10H_2O$) | 25 |
| Sodium hydroxide | 3 |
| Deionized water | 100 |

| (b) | |
|---|---|
| Glucose | 25 |
| Ferric nitrate ($NO_3)_3Fe_2,9H_2O$ | 0.225 |
| Deionized water | 100 |

| (c) | |
|---|---|
| Acrylonitrile | 500 |
| Butadiene | 2,000 |
| Divinylbenzene in the form of a 55% by weight solution | 100 |
| Cumene hydroperoxide | 0.9 |

The polymerization was carried out at 40° C. until the residual pressure reached 1kg./cm.$^2$, after which the autoclave was cooled down.

The polymer obtained after coagulation of the latex and drying is easily worked at low temperature into very flexible and transparent sheets having an attractive-looking surface.

This polymer is entirely soluble in dichlorethane.

Using fractional precipitation techniques, it was not possible to reveal the presence of any polyvinyl chloride homopolymer or any butadiene-acrylonitrile copolymer. All of the monomer mixture was grafted onto the p.v.c. trunk.

*Example 9*

The steps of Example 8 were followed except that divinylbenzene was replaced by 100 g. of tetraethyleneglycol dimethacrylate.

The polymer obtained was completely grafted. Sheets formed with this polymer material were smooth and their surface was attractive.

*Example 10*

The procedural steps of Example 3 were followed, except that with the monomers (acrylonitrile and butadiene), 0.02 P of divinylbenzene in the form of a 55% by weight solution was introduced in the polymerization reaction. After polymerization, the latex was coagulated, and the polymer was filtered, washed and dried. It was then worked up on cylinders and flexible transparent sheets were easily obtained, having an attractive-looking surface.

Fractional precipitation with methanol of dichloroethane solutions of polymer (b) produced fractions which are entirely different in nature from the fractional precipitation of a mixture formed of a homopolymer of vinylchloride on the one hand a copolymer of butadiene-acrylonitrile on the other hand, the resulting mixture having the same monomer composition as the graft polymer (b). This fractional precipitation test indicates that the structure of polymer (b), is entirely different from the structure of a simple mixture of its homopolymer constituents.

While the foregoing examples have illustrated homopolymers of vinyl chloride, it should be well recognized that the functional radical is the chloride radical which is present not only in homopolymers of vinyl chloride but is also present in homopolymers of vinylidene chloride and copolymers former from vinyl chloride monomers and other ethylenically unsaturated compounds including esters, such as vinyl acetate, fumaric esters, maleic esters, acrylic esters, and halogenated vinyl monomers.

We claim:

1. A graft polymer which comprises the graft polymer obtained by reacting a polyvinylchloride with a monomer mixture composed of about 20 to 80% by weight of butadiene and about 80 to 20% by weight of acrylonitrile monomer, and a member of the group of vinyl and vinylidene monomers consisting of divinylbenzene, divinylether, monoalkyleneglycol dimethacrylate, polyalkyleneglycol dimethacrylate, monoalkyleneglycoldiacrylate, polyalkyleneglycol diacrylate, allyl acrylate and allyl methacrylate, the proportions of said member with respect to the butadiene and the acrylonitrile being up to 10% by weight, said graft polymer containing grafted branch chains derived from said mixture equaling 40 to 60% thereof by weight.

2. The graft polymer of claim 1, wherein said reaction occurs in the presence of a polymerization initiator.

3. The graft polymer of claim 2, wherein 4 to 15% of the weight of the branch chains is derived from butadiene.

4. The graft polymer of claim 2, wherein 15 to 40% of the weight of branch chains is derived from butadiene.

5. The graft polymer of claim 2, wherein said monomer mixture contains divinylbenzene.

6. The graft polymer of claim 2, wherein said monomer mixture contains tetraethyleneglycol dimethacrylate.

7. A graft polymer, which comprises the graft polymer obtained by reacting a copolymer of vinyl chloride and other ethylenically unsaturated compounds copolymerizable therewith, with a monomer mixture composed of about 20 to 80% by weight of butadiene and about 80 to 20% by weight of acrylonitrile monomer, and a member of the group of vinyl monomers consisting of divinylbenzene, divinylether, monoalkyleneglycol dimethacrylate, polyalkyleneglycol dimethacrylate, monoalkyleneglycol diacrylate, polyalkyleneglycol diacrylate, allyl acrylate and allyl methacrylate in the presence of a polymerization initiator, the proportions of said member with respect to the butadiene and the acrylonitrile being up to 10% by weight, and said graft polymer containing grafted branch chains derived from said mixture in the range between about 40 and 60% respectively thereof by weight.

8. A process for producing a graft polymer which comprises reacting (1) a polyvinylchloride with a monomer mixture compose of about 20 to 80% by weight of butadiene and about 80 to 20% by weight of acrylonitrile monomer, and a member of the group of vinyl monomers consisting of divinylbenzene, divinylether, monoalkyleneglycol dimethacrylate, polyalkyleneglycol dimethacrylate monoalkyleneglycol diacrylate polyalkyleneglycol diacrylate, allyl acrylate and allyl methacrylate in the presence of a polymerization initiator, the proportions of said member with respect to the butadiene and the acrylonitrile being up to 10% by weight, and said graft polymer containing grafted branch chains derived from said mixture in the range between about 40 to 60% respectively thereof by weight.

9. The process of claim 8 wherein said polymerization initiator is a catalyst.

10. The process of claim 8, wherein said polymerization initiator is ionizing radiation.

References Cited

UNITED STATES PATENTS

| | | | |
|---|---|---|---|
| 2,155,590 | 4/1939 | Garvey | 260—884 XR |
| 2,614,089 | 10/1952 | Harrison et al. | 260—879 XR |
| 2,983,657 | 5/1961 | Gabilly et al. | 204—154 |
| 2,996,469 | 8/1961 | Cole et al. | 260—879 XR |

SAMUEL H. BLECH, *Primary Examiner.*

MURRAY TILLMAN, *Examiner.*

G. F. LESMES, *Assistant Examiner.*